United States Patent
Kono et al.

(10) Patent No.: US 11,660,796 B2
(45) Date of Patent: May 30, 2023

(54) DIE FOR EXTRUSION AND METHOD OF DESIGNING DIE FOR EXTRUSION

(71) Applicant: NITTO DENKO CORPORATION, Ibaraki (JP)

(72) Inventors: Yoshinori Kono, Ibaraki (JP); Akifumi Kido, Ibaraki (JP); Makoto Azukizawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 132 days.

(21) Appl. No.: 16/918,442

(22) Filed: Jul. 1, 2020

(65) Prior Publication Data
US 2021/0039296 A1    Feb. 11, 2021

(30) Foreign Application Priority Data
Aug. 9, 2019   (JP) .............................. JP2019-147738

(51) Int. Cl.
| | | |
|---|---|---|
| *B29C 48/08* | (2019.01) | |
| *B29C 48/305* | (2019.01) | |
| *B29C 44/20* | (2006.01) | |
| *B29K 105/24* | (2006.01) | |
| *B29K 23/00* | (2006.01) | |
| *B29K 105/04* | (2006.01) | |

(52) U.S. Cl.
CPC .......... *B29C 48/305* (2019.02); *B29C 44/20* (2013.01); *B29C 48/08* (2019.02); *B29K 2023/16* (2013.01); *B29K 2105/04* (2013.01); *B29K 2105/24* (2013.01)

(58) Field of Classification Search
CPC ....... B29C 48/305; B29C 48/08; B29C 44/20; B29C 48/07; B29C 48/307; B29C 48/31; B29C 48/313; B29C 48/302; B29C 44/505; B29K 2023/16; B29K 2105/04; B29K 2105/24
USPC ........................................................ 425/461
See application file for complete search history.

(56) References Cited

U.S. PATENT DOCUMENTS

2017/0254937 A1* 9/2017 Nakahori ................ B32B 27/00

FOREIGN PATENT DOCUMENTS

| JP | 2001-158036 A | 6/2001 |
|---|---|---|
| JP | 4571209 B2 | 10/2010 |
| JP | 2015-098155 A | 5/2015 |

OTHER PUBLICATIONS

Office Action dated Feb. 28, 2023, issued in corresponding JP Patent Application No. 2019-147738 with English machine translation. (4 pgs.).

* cited by examiner

*Primary Examiner* — Jeffrey M Wollschlager
*Assistant Examiner* — Xue H Liu
(74) *Attorney, Agent, or Firm* — WHDA, LLP

(57) ABSTRACT

There is provided a die for extrusion in which an undesired reaction is suppressed in an inside thereof and with which variation in thickness of a resin sheet to be obtained can be reduced. A die for extrusion of the present invention includes: a cylindrical inflow port into which a molten resin flows; a manifold connected to the inflow port; a first slit connected to the manifold; a second slit connected to the first slit; and a lip land connected to the second slit. In the die for extrusion, the shape of a flow path is optimized based on a relationship among a position in the die, an operation time, and a vulcanization degree.

3 Claims, 4 Drawing Sheets

DIE FOR EXTRUSION AND METHOD OF DESIGNING DIE FOR EXTRUSION

BACKGROUND OF THE INVENTION

This application claims priority under 35 U.S.C. Section 119 to Japanese Patent Application No. 2019-147738 filed on Aug. 9, 2019 which is herein incorporated by reference.

1. Field of the Invention

The present invention relates to a die for extrusion and a method of designing a die for extrusion.

2. Description of the Related Art

A foamed resin sheet, such as an ethylene-propylene-diene rubber (EPDM) foam, is widely used for various industrial applications. A composition for forming such foamed resin sheet has often blended therein a vulcanizing agent, a reactive chemical (e.g., a vulcanization accelerator), and the like. The foamed resin sheet as described above is typically produced by: preparing a master batch (MB) through kneading; storing the MB; adding the reactive chemical to the MB after the storage to prepare a final batch (FB); storing the FB; and, while loading an additional reactive chemical into the FB after the storage, extruding the FB. However, such production method requires the storage of the FB, and hence the characteristics of the composition for forming the foamed resin sheet are changed. As a result, a foamed resin sheet to be obtained may have variation in quality.

In order to solve the above-mentioned problem, there is proposed a technology for avoiding the storage of the FB, including continuously loading the reactive chemical and the additional reactive chemical in an extruder (e.g., Japanese Patent No. 4571209). However, it has been found that such technology requires extrusion at high temperature, and as a result, the following problems newly arise: (1) undesired vulcanization occurs in a die for extrusion, and as a result, a non-foamed portion (a so-called nodule) attributed to the vulcanization may be formed in a foamed resin sheet to be obtained; and (2) the foamed resin sheet to be obtained may have variation in thickness. Accordingly, there is a demand for a new technology capable of avoiding such problems.

SUMMARY OF THE INVENTION

The present invention has been made in order to solve the above-mentioned conventional problems, and a primary object of the present invention is to provide a die for extrusion in which an undesired reaction is suppressed in an inside thereof and with which variation in thickness of a resin sheet to be obtained can be reduced.

A die for extrusion according to at least one embodiment of the present invention includes: a cylindrical inflow port into which a molten resin flows; a manifold connected to the inflow port; a first slit connected to the manifold; a second slit connected to the first slit; and a lip land connected to the second slit. When seen in plan view on each of an upper part and a lower part of the first slit, the manifold has a substantially inverted V-shape in which an apex is flattened at a connected portion to the inflow port, and which extends in a width direction toward a downstream direction with a center portion of the inflow port at the connected portion as an apex angle portion; portions forming the V-shape are each reduced in thickness and width from the connected portion to the inflow port toward the downstream direction; and the apex angle portion of the V-shape is configured so that the inflow port extends in a tapered shape to the first slit while being reduced in thickness toward the downstream direction. When seen in plan view, the first slit is defined, by the manifold, as a pentagon shape in which an isosceles triangle and a rectangle are combined with each other. The second slit includes: a flat portion defined as a center portion in a flow direction; a first tapered portion connected to the first slit and reduced in thickness from a thickness of the first slit to a thickness of the flat portion; and a second tapered portion connected to the lip land and increased in thickness from the thickness of the flat portion to a thickness of the lip land. With respect to a diameter of the inflow port, a ratio of an extended length of the apex angle portion of the V-shape is 1.45 or less, a ratio of a thickness of the second slit is 0.04 or less, and a ratio of a length of the lip land is 0.92 or more. A taper angle of the apex angle portion of the V-shape is 38° or more, and an apex angle of the isosceles triangle of the first slit is 110° or less.

In one embodiment of the present invention, the molten resin includes a vulcanizing agent, and the molten resin has a maximum vulcanization degree of 76.8% or less in the die at a time of continuous operation for 144 hours.

In one embodiment of the present invention, a difference between a maximum value and a minimum value of a thickness of a resin sheet to be obtained in the width direction is 20% or less of a preset thickness.

According to another aspect of the present invention, there is provided a method of designing the above-described die for extrusion. The method includes: creating, on an assumption that a vulcanization degree of a molten resin containing a vulcanizing agent to be extruded with an existing die for extrusion is correlated with an operation time and a position in the die, a regression model on a relationship between a maximum vulcanization degree at a predetermined position in the existing die for extrusion and an operation time by locally weighted regression analysis; extracting a control factor from a regression model approximated to a relationship between a maximum vulcanization degree and an operation time actually measured for the molten resin containing a vulcanizing agent through use of the existing die for extrusion; extracting, based on the control factor, a flow path shape factor correlated with the regression model; and adjusting the flow path shape factor so that a maximum vulcanization degree of the molten resin in the die at a time of continuous operation for 144 hours is equal to or less than a predetermined value in the regression model.

According to at least one embodiment of the present invention, the die for extrusion, in which an undesired reaction is suppressed in an inside thereof, and with which variation in thickness of the resin sheet to be obtained can be reduced, can be achieved by optimizing the shape of a flow path based on a relationship among a position in the die, an operation time, and a vulcanization degree.

DESCRIPTION OF THE EMBODIMENTS

Embodiments of the present invention are described below with reference to the drawings. However, the present invention is not limited to these embodiments.

A. Die for Extrusion

Figure 1:
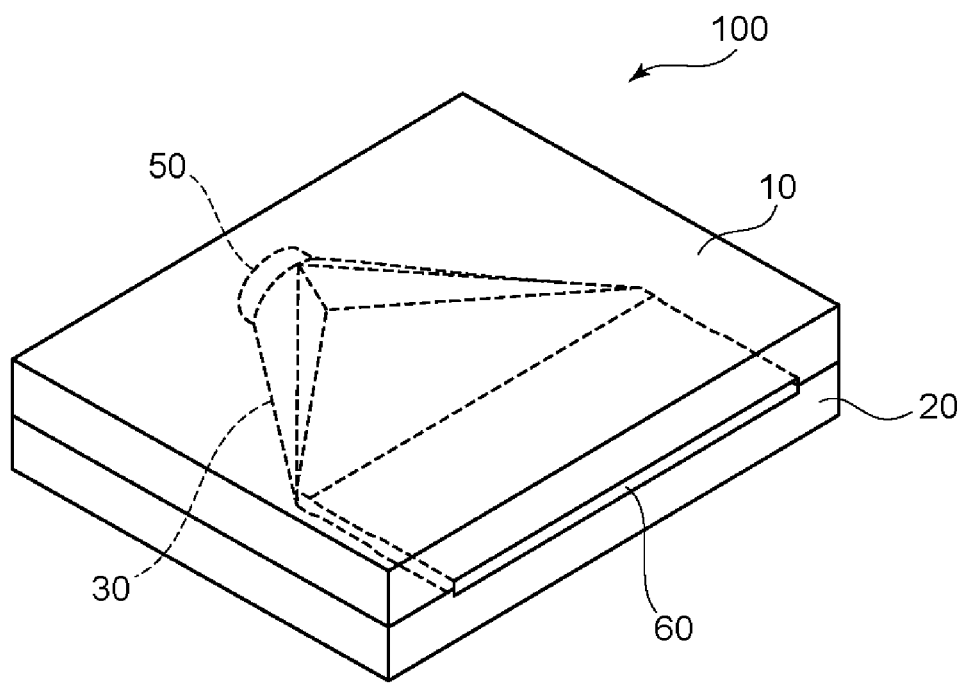
FIG. 1 is a schematic perspective view of a die for extrusion according to one embodiment of the present invention.

FIG. 1 is a schematic perspective view of a die for extrusion according to one embodiment of the present invention. A die 100 for extrusion is typically formed by combining a first die main body 10 and a second die main body 20 with any appropriate means (e.g., a joint bolt (not shown)). A flow path 30 is defined in an inside of the die 100 for extrusion by a recess formed in the first die main body 10 and/or the second die main body 20. Further, the die 100 for extrusion includes: a die inlet 50 configured to take in a molten resin extruded from an extruder (not shown); and a die outlet 60 configured to discharge the molten resin as a resin sheet. The flow path 30 drawn by the broken line of FIG. 1 is simplified for easy understanding, and does not correspond to the shapes of flow paths illustrated in FIG. 2 to FIG. 4. Similarly, the flow paths illustrated in FIG. 1 to FIG. 4 do not have the same ratio among a length, a width, and a thickness.

Figure 2:
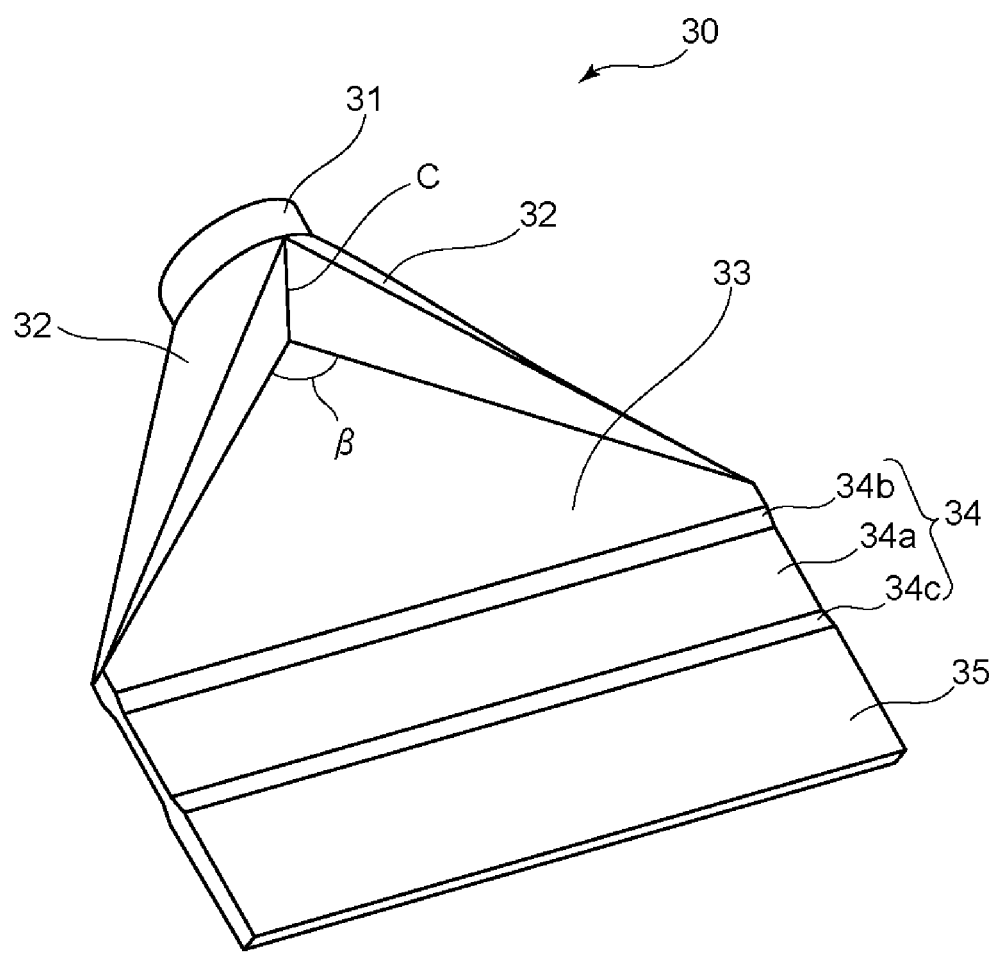
FIG. 2 is schematic view for illustrating the shape of a flow path of the die for extrusion according to the one embodiment of the present invention.
Figure 3:
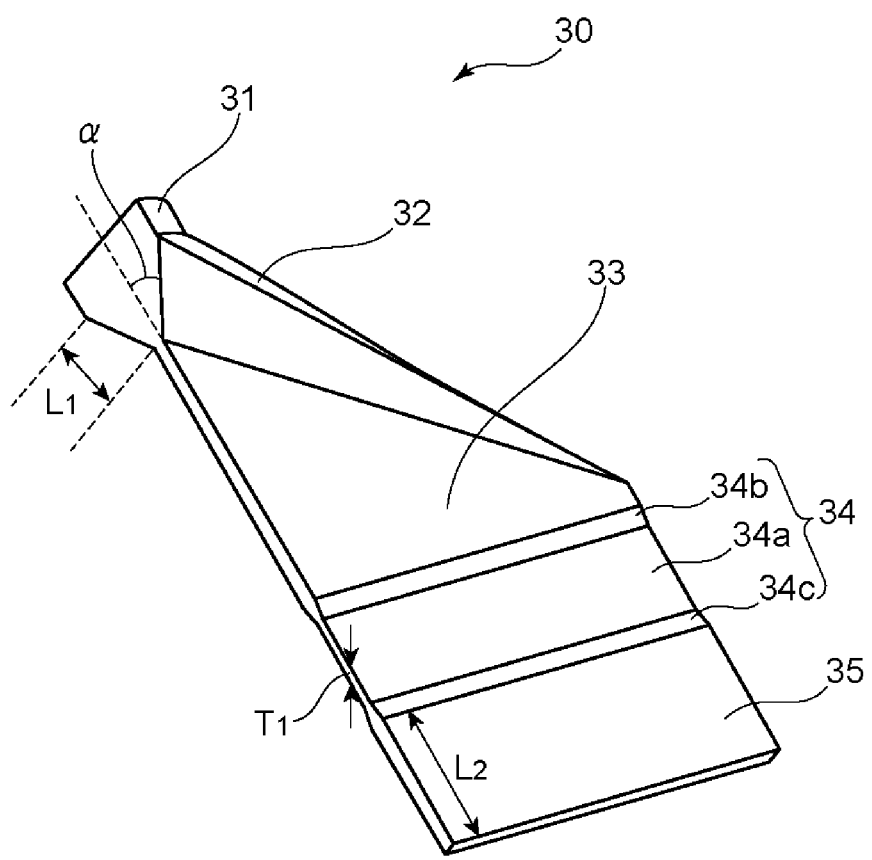
FIG. 3 is a schematic perspective view for illustrating a main portion of the flow path of FIG. 2 in the state of being cut in half.
Figure 4:
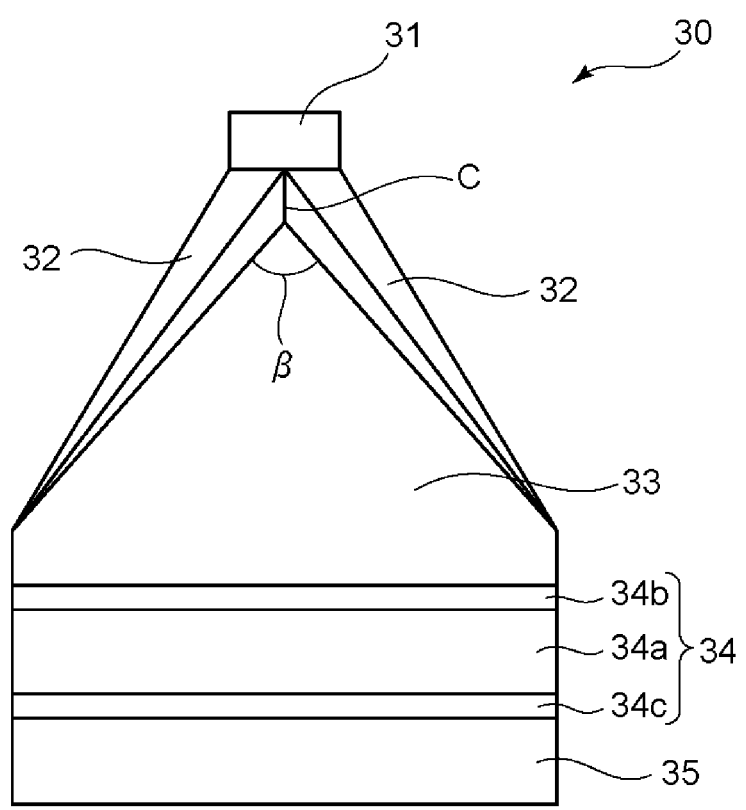
FIG. 4 is a schematic plan view of the flow path of FIG. 2.

FIG. 2 is a schematic view for illustrating the shape of the flow path 30 of the die 100 for extrusion, FIG. 3 is a schematic perspective view for illustrating a main portion of the flow path 30 in the state of being cut in half, and FIG. 4 is a schematic plan view of the flow path 30. The die 100 (substantially, the flow path 30) includes: a cylindrical inflow port 31 into which the molten resin taken in from the die inlet 50 flows; and in an order from the inflow port 31 toward a downstream side, a manifold 32 connected to the inflow port 31, a first slit 33 connected to the manifold 32, a second slit 34 connected to the first slit 33, and a lip land 35 connected to the second slit 34 and provided with the die outlet 60 on a most downstream side.

When seen in plan view on each of an upper part and a lower part of the first slit 33, the manifold 32 has a substantially inverted V-shape in which an apex is flattened at a connected portion to the inflow port 31, and which extends in a width direction toward a downstream direction with a center portion C of the inflow port 31 at the connected portion as an apex angle portion. More specifically, for convenience, the manifold 32 is formed of four portions in total, that is, two portions on the upper part of the first slit 33 and two portions on the lower part of the first slit 33. The two portions on the upper part of the first slit 33 are illustrated in FIG. 4. The portions 32, 32, 32, and 32 (the two lower ones are not illustrated) forming the manifold are each reduced in thickness and width from the connected portion to the inflow port 31 toward the downstream direction, and both in top view and in lateral view, each have an inequilateral triangle shape. The apex angle portion (i.e., the center portion C of the inflow port 31 at the connected portion) of the V-shape is configured so that the inflow port 31 extends in a tapered shape to the first slit 33 while being reduced in thickness toward the downstream direction. The "width direction" as used herein refers to a direction perpendicular to a flow direction of the molten resin, the "upstream" as used herein refers to a die inlet side, and the "downstream" as used herein refers to a die outlet side.

When seen in plan view on each of the upper part and the lower part of the first slit 33, the first slit 33 is defined, by the four portions 32, 32, 32, and 32 of the manifold (the two lower ones are not illustrated), as a pentagon shape in which an isosceles triangle and a rectangle are combined with each other.

The second slit 34 includes: a flat portion 34a defined as a center portion in a flow direction; a first tapered portion 34b connected to the first slit 33 and reduced in thickness from the thickness of the first slit 33 to the thickness of the flat portion 34a; and a second tapered portion 34c connected to the lip land 35 and increased in thickness from the thickness of the flat portion 34a to the thickness of the lip land 35.

In the die 100 for extrusion, the shape of the flow path 30 is defined so that the molten resin is retained in the die for an extremely short time, and as a result, an undesired reaction in the inside thereof is suppressed, and variation in thickness of a resin sheet to be obtained is reduced. Specifically, the shape of the flow path 30 is defined as described below. A ratio of an extended length $L_1$ of the apex angle portion (i.e., the center portion C of the inflow port 31 at the connected portion) of the V-shape to the diameter of the inflow port 31 is 1.45 or less, preferably from 1.00 to 1.35, more preferably from 1.00 to 1.25. A ratio of a thickness $T_1$ of the second slit 34 (substantially, the flat portion 34a) to the diameter of the inflow port 31 is 0.04 or less, and is from 0.03 to 0.04 in one embodiment and from 0.02 to 0.03 in another embodiment. A ratio of a length La of the lip land 35 to the diameter of the inflow port 31 is 0.92 or more, preferably from 0.92 to 1.00, more preferably from 0.92 to 0.95. Further, a taper angle α of the apex angle portion (i.e., an extended portion of the center portion C of the inflow port 31 at the connected portion) of the V-shape is 38° or more, preferably from 38° to 42°, more preferably from 38° to 40°. In addition, an angle β of an apex of the isosceles triangle of the first slit 33 is 110° or less, preferably from 90° to 110°, more preferably from 100° to 110°.

As described above, according to the die 100 for extrusion, the molten resin is retained in the die for an extremely short time, and as a result, an undesired reaction in the inside thereof can be suppressed, and variation in thickness of a resin sheet to be obtained can be reduced. For example, when the molten resin contains a vulcanizing agent, the molten resin has a maximum vulcanization degree of preferably 76.8% or less, more preferably 25% or less in the die 100 for extrusion at the time of continuous operation for 144 hours. The "vulcanization degree" as used herein is determined from a measured value G' of a storage elastic modulus by the following equation.

$$\text{Vulcanization degree (\%)} = (G' - G'_0)/(G'_{max} - G'_0)$$

In the equation, $G'_0$ represents a storage elastic modulus (kPa) in an unvulcanized state, and $G'_{max}$ represents a storage elastic modulus (kPa) in a final vulcanized state.

Further, according to the die 100 for extrusion, a difference between a maximum value and a minimum value of the thickness of a resin sheet to be obtained in the width direction is preferably 20% or less, more preferably 10% or less of a preset thickness.

The die for extrusion according to the embodiment of the present invention can be suitably used for the production (substantially, extrusion) of a resin sheet to be widely used for various industrial applications. The resin sheet may be a foamed resin sheet in one embodiment and may be a vulcanized foamed resin sheet in another embodiment. The vulcanized foamed resin sheet is formed of, for example, an ethylene-propylene-diene rubber (EPDM) foam. The EPDM foam is described in, for example, Japanese Patent No. 5420386, the description of which is incorporated herein by reference.

B. Method of Designing Die for Extrusion

The die for extrusion described in the above-mentioned section A can be designed by optimizing the shape of the flow path based on a position in the die, an operation time, and a vulcanization degree. Accordingly, such design method is also encompassed by the embodiment of the present invention. A method of designing the die for extrusion according to the embodiment of the present invention includes: on the assumption that the vulcanization degree of a molten resin containing a vulcanizing agent to be extruded with an existing die for extrusion is correlated with an operation time and a position in the die, creating a regression model on a relationship between a maximum vulcanization degree at a predetermined position in the existing die for extrusion and an operation time by locally weighted regression analysis; extracting a control factor from a regression model approximated to a relationship between a maximum vulcanization degree and an operation time actually measured for the molten resin containing a vulcanizing agent through use of the existing die for extrusion; extracting, based on the control factor, a flow path shape factor correlated with the regression model; and adjusting the flow path shape factor so that a maximum vulcanization degree of the molten resin in the die at the time of continuous operation for 144 hours is equal to or less than a predetermined value in the regression model. The steps are described below.

First, the vulcanization degree is quantitatively defined. As described in the above-mentioned section A, the vulcanization degree is determined from a measured value G' of a storage elastic modulus by the following equation.

Vulcanization degree (%)=$(G'-G'_0)/(G'_{max}-G'_0)$

Next, the vulcanization degree is correlated with a chemical (e.g., a vulcanizing agent or a vulcanization accelerator) in the molten resin, a temperature, and a heating time (retention time in the die), and the heating time is correlated with an operation time and a position in the die. Herein, in the production of one foamed resin sheet, the blended amount of the chemical and the temperature are substantially constant, and hence it is assumed that the vulcanization degree of the molten resin is correlated with the operation time and the position in the die. Herein, a regression model on a relationship between a maximum vulcanization degree at a predetermined position in an existing die for extrusion and an operation time is considered by locally weighted regression analysis. The "locally weighted regression analysis" refers to creating, in consideration of the fact that a regression model may be changed in each explanatory variable interval, a regression model through division into a plurality of regions that can each be linearly approximated. Various regression models created by changing the variables (i.e., the operation time and the position in the die) and actually measured values at a predetermined position in the existing die for extrusion are compared, and a regression model approximated to the actually measured values is derived. The regression model thus derived is regarded as a regression model at the predetermined position in the existing die for extrusion.

Next, from the regression model obtained as described above, a control factor related to the vulcanization degree is extracted. Specifically, as control factors, a retention time, a strain rate, and a flow rate are extracted. Based on such control factors, a flow path shape factor correlated with the obtained regression model is extracted. In the embodiment of the present invention, as flow path shape factors, the shape of the connected portion between the inflow port and the manifold, the shape of the manifold, the shape of the first slit, the shape of the second slit, and the shape of the lip land are extracted. Those shapes are adjusted so that the maximum vulcanization degree of the molten resin in the die at the time of continuous operation for 144 hours is equal to or less than a predetermined value (e.g., 76.8%) in the regression model. Specifically, as a result of trial and error, it has been found that the maximum vulcanization degree of the molten resin in the die at the time of continuous operation for 144 hours can be controlled to be equal to or less than the predetermined value by adjusting the ratio of the extended length of the apex angle portion of the V-shape to the diameter of the inflow port, the ratio of the thickness of the second slit to the diameter of the inflow port, the ratio of the length of the lip land to the diameter of the inflow port, the taper angle of the apex angle portion of the V-shape, and the angle of the apex of the isosceles triangle of the first slit to the values or ranges described in the above-mentioned section A.

In this manner, a die for extrusion in which an undesired reaction is suppressed in an inside thereof and with which variation in thickness of a resin sheet to be obtained can be reduced can be designed.

EXAMPLES

The present invention is specifically described below byway of Examples, but the present invention is not limited to Examples. In Examples, "part(s)" and "%" are by weight unless otherwise specified.

(1) Maximum Vulcanization Degree

A plurality of samples were prepared from the same final batch as that used in Example 1. The plurality of samples were loaded into a batch oven set to a heating temperature of 90° C. and heated by changing a heating time. The samples after the heating were measured for vulcanization degrees, and the vulcanization degree at the time of saturation was used as a maximum vulcanization degree.

(2) Variation in Thickness

A thickness distribution in a width direction was calculated by the following procedure. A cross section of a die outlet was evenly divided in the width direction and in the thickness direction (e.g., divided into n1 pieces in the width direction and into n2 pieces in the thickness direction: the divided cross sections were each hereinafter referred to as "micro cross section ($m^2$)"). Information on a flow rate (m/s) at each micro cross section $m^2$) was determined, and the area ($m^2$) of the micro cross section and the flow rate (m/s) were multiplied by each other, to thereby determine a flow amount ($m^3$/s) at the micro cross section. The flow amount was multiplied by the number of pieces (×n2) in the thickness direction of the die, to thereby determine a flow amount ($m^3$/s) at a predetermined position in the width direction of the die. The flow amount was divided by the total area of the micro cross sections (the area of the micro cross section×n2) in the thickness direction, to thereby determine an ejection thickness (m/s) per unit time at the predetermined position. The ejection thicknesses per unit time were determined in the same manner throughout the width direction of the die, to thereby determine an ejection thickness distribution per unit time in the width direction. While predetermined regions on both sides, which were not used as a product, were excluded, a ratio (%) of a difference between a maximum value and a minimum value of the ejection thickness per unit time to a preset ejection thickness per unit time was used as variation in thickness.

(3) Total Judgment

The case in which the maximum vulcanization degree obtained in the above-mentioned section (1) satisfied 76.8% or less and the variation in thickness obtained in the above-mentioned section (2) satisfied 20% or less of the preset thickness was evaluated as Symbol "○" (good), and the case in which at least one of the maximum vulcanization degree obtained in the above-mentioned section (1) or the variation in thickness obtained in the above-mentioned section (2) did not satisfy the above-mentioned values was evaluated as Symbol "x" (insufficient).

Example 1

1. Design of Die for Extrusion

By the design method described in the "DESCRIPTION OF THE EMBODIMENTS" section, a die for extrusion as illustrated in FIG. 1 to FIG. 4 was designed. The produced die for extrusion included a flow path having the following shape: the diameter of the inflow port was 110 mm; the ratio of the extended length $L_1$ of the apex angle portion of the V-shape to the diameter of the inflow port was 0.50; the ratio of the thickness $T_1$ of the second slit to the diameter of the inflow port was 0.03; the ratio of the length $L_2$ of the lip land to the diameter of the inflow port was 0.94; the taper angle α of the apex angle portion of the V-shape was 39°; and the angle β of the apex of the isosceles triangle of the first slit was 55°.

2. Composition for Foamed Resin Sheet

The following materials were loaded as a master batch from an introduction port of a twin-screw extruder on an upstream side: 50 parts of an EPDM ("EPT3045" manufactured by Mitsui Chemicals, diene content: 4.7 wt %), 50 parts of an EPDM ("EP-24" manufactured by JSR Corporation, diene content: 4.5 wt %), 5 parts of a vulcanizing aid (two kinds of zinc oxide manufactured by Mitsui Mining & Smelting Co., Ltd.), 3 parts of a lubricant ("powdered stearic acid Sakura" manufactured by NOF Corporation), 100 parts of a filler (N-ground calcium carbonate manufactured by Maruo Calcium Co., Ltd.), 10 parts of a pigment ("Asahi #50", which was carbon black manufactured by Asahi Carbon Co., Ltd.), 5 parts of paraffin (softening agent, "Parapere 130" manufactured by Taniguchi Oil Corporation, melting point: 54.4° C. to 57.2° C., penetration: 50 or less), 130 parts of asphalt (softening agent, "Blown Asphalt 10-20" manufactured by Nippon Oil Corporation, softening point: 135° C. to 142° C., penetration (25° C.): 10 to 20), 40 parts of a paraffin-based oil (softening agent, "Diana Process Oil PW-90" manufactured by Idemitsu Kosan Co., Ltd., density: 0.85 g/cm$^3$ to 0.89 g/cm$^3$, kinetic viscosity (40° C.): 75.0 cSt to 105.0 cSt), 0.45 part of a thiazole-based vulcanization accelerator (2-mercaptobenzothiazole) ("Nocceler M" manufactured by Ouchi Shinko Chemical Industrial Co., Ltd.), 0.2 part of a dithiocarbamic acid-based vulcanization accelerator (zinc dibenzyldithiocarbamate) ("Nocceler Z" manufactured by Ouchi Shinko Chemical Industrial Co., Ltd.), and 2.26 parts of a thiuram-based vulcanization accelerator (tetrabenzylthiuram disulfide) ("Nocceler TBzTD" manufactured by Ouchi Shinko Chemical Industrial Co., Ltd.).

Next, the following materials were loaded as reactive chemicals for a final batch from an introduction port of the twin-screw extruder on a downstream side: 1.6 parts of a vulcanizing agent ("Alphagran S-50EN", which was sulfur manufactured by Touchi Co., Ltd.); 1 part of a thiourea-based vulcanization accelerator (N,N-dibutylthiourea) ("Nocceler BUR" manufactured by Ouchi Shinko Chemical Industrial Co., Ltd.); 20 parts of azodicarbonamide (ADCA) (foaming agent, "AC #LQ" manufactured by Eiwa Chemical Ind. Co., Ltd.); and 6.5 parts of a urea-based foaming aid ("Cellpaste K5" manufactured by Eiwa Chemical Ind. Co., Ltd.). Thus, a final batch (molten resin) for a foamed resin sheet was continuously prepared.

3. Simulation of Extrusion of Foamed Resin Sheet

The following case was simulated: the final batch (molten resin) obtained in the above-mentioned section 2. was supplied to the die for extrusion of the above-mentioned section 1. mounted to the twin-screw extruder continuously from its preparation, and a foamed resin sheet was extrusion molded. The maximum vulcanization degree at the time of extrusion was determined according to the above-mentioned section (1), and the variation in thickness of the obtained foamed resin sheet was determined according to the above-mentioned section (2). The results are shown in Table 1.

Examples 2 to 6 and Comparative Examples 1 to 5

Simulation was performed in the same manner as in Example 1 except that the shape of the flow path of the die for extrusion was changed as shown in Table 1. The maximum vulcanization degree at the time of extrusion and the variation in thickness of the obtained foamed resin sheet were determined in the same manner as in Example 1. The results are shown in Table 1.

TABLE 1

|  |  | Example 1 | Example 2 | Comparative Example 1 | Example 3 | Comparative Example 2 | Example 4 | Comparative Example 3 | Example 5 | Comparative Example 4 | Example 6 | Comparative Example 5 |
|---|---|---|---|---|---|---|---|---|---|---|---|---|
| Ratio of extended length $L_1$ | (—) | 1.44 | 1.47 | 1.45 | 1.45 | 1.45 | 1.45 | 1.45 | 1.45 | 1.45 | 1.45 | 1.45 |
| Angle α | (°) | 39 | 39 | 39 | 39 | 37 | 39 | 39 | 39 | 39 | 39 | 39 |
| Angle β | (°) | 55 | 55 | 55 | 55 | 55 | 54 | 56 | 55 | 55 | 55 | 55 |
| Ratio of length $L_2$ of lip land | (—) | 0.94 | 0.94 | 0.94 | 0.94 | 0.94 | 0.94 | 0.94 | 0.93 | 0.91 | 0.94 | 0.94 |
| Ratio of thickness $T_1$ of slit | (—) | 0.03 | 0.03 | 0.03 | 0.03 | 0.03 | 0.03 | 0.03 | 0.03 | 0.03 | 0.03 | 0.05 |

TABLE 1-continued

|  |  | Example 1 | Example 2 | Comparative Example 1 | Example 3 | Comparative Example 2 | Example 4 | Comparative Example 3 | Example 5 | Comparative Example 4 | Example 6 | Comparative Example 5 |
|---|---|---|---|---|---|---|---|---|---|---|---|---|
| Maximum vulcanization degree | (%) | 65.5 | 76.5 | 76.9 | 76.7 | 75.7 | 76.1 | 77.3 | 76.7 | 76.7 | 76.7 | 80.7 |
| Variation in thickness | (%) | 20.0 | 20.0 | 20.0 | 20.0 | 22.0 | 18.0 | 21.3 | 20.0 | 20.7 | 20.0 | 20.0 |
| Total judgment |  | ○ | ○ | x | ○ | x | ○ | x | ○ | x | ○ | x |

As is apparent from Table 1, according to Examples of the present invention, the shape of the flow path is optimized, and thus the maximum vulcanization degree in the inside of the die can be equal to or less than the predetermined value, and the variation in thickness of the resin sheet to be obtained can be equal to or less than the predetermined value.

The die for extrusion of the present invention can be suitably used for the production (substantially, extrusion) of a resin sheet to be widely used for various industrial applications.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A die for extrusion, comprising:
a cylindrical inflow port into which a molten resin flows;
a manifold connected to the inflow port;
a first slit connected to the manifold;
a second slit connected to the first slit; and
a lip land connected to the second slit,
wherein: when seen in plan view on each of an upper part and a lower part of the first slit, the manifold has a substantially inverted V-shape in which an apex is flattened at a connected portion to the inflow port, and which extends in a width direction toward a downstream direction with a center portion of the inflow port at the connected portion as an apex angle portion; portions forming the V-shape are each reduced in thickness and width from the connected portion to the inflow port toward the downstream direction; and the apex angle portion of the V-shape is configured so that the inflow port extends in a tapered shape to the first slit while being reduced in thickness toward the downstream direction,
wherein, when seen in plan view, the first slit is defined, by the manifold, as a pentagon shape in which an isosceles triangle and a rectangle are combined with each other,
wherein the second slit includes: a flat portion defined as a center portion in a flow direction; a first tapered portion connected to the first slit and reduced in thickness from a thickness of the first slit to a thickness of the flat portion; and a second tapered portion connected to the lip land and increased in thickness from the thickness of the flat portion to a thickness of the lip land,
wherein, with respect to a diameter of the inflow port, a ratio of an extended length of the apex angle portion of the V-shape is 1.45 or less, a ratio of a thickness of the second slit is 0.04 or less, and a ratio of a length of the lip land is 0.92 or more, and
wherein a taper angle α of the apex angle portion of the V-shape is 38° or more, and an apex angle of the isosceles triangle of the first slit is 110° or less.

2. The die for extrusion according to claim 1,
wherein the molten resin comprises a vulcanizing agent, and
wherein the molten resin has a maximum vulcanization degree of 76.8% or less in the die at a time of continuous operation for 144 hours.

3. The die for extrusion according to claim 1, wherein a difference between a maximum value and a minimum value of a thickness of a resin sheet to be obtained in the width direction is 20% or less of a preset thickness.

* * * * *